US011281011B2

(12) United States Patent
Chiu et al.

(10) Patent No.: US 11,281,011 B2
(45) Date of Patent: Mar. 22, 2022

(54) HEAD MOUNTED DISPLAY (71) Applicant: Acer Incorporated, New Taipei (TW)

(72) Inventors: Yi-Jung Chiu, New Taipei (TW);
Shih-Ting Huang, New Taipei (TW);
Yen-Hsien Li, New Taipei (TW);
Tsung-Wei Tu, New Taipei (TW);
Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/033,692

(22) Filed: Sep. 26, 2020

(65) Prior Publication Data

US 2021/0333553 A1   Oct. 28, 2021

(30) Foreign Application Priority Data

Apr. 27, 2020   (TW) .................................. 109114020

(51) Int. Cl.
*G02B 27/01* (2006.01)
(52) U.S. Cl.
CPC ..... *G02B 27/0172* (2013.01); *G02B 27/0176* (2013.01); *G02B 2027/013* (2013.01); *G02B 2027/0118* (2013.01)
(58) Field of Classification Search
CPC ............ G02B 27/0172; G02B 27/0176; G02B 27/02; G09F 9/30; G02F 1/1343; H01L 27/326; H05B 33/22
See application file for complete search history.

(56) References Cited

U.S. PATENT DOCUMENTS

| 4,867,555 | A  | * | 9/1989 | Vanderwerf | G02B 9/58 353/98 |
| 10,057,968 | B2 | * | 8/2018 | Gribetz | G02B 27/0172 |
| 2010/0218641 | A1 | * | 9/2010 | Neumann | B62D 1/046 74/552 |
| 2018/0092180 | A1 | * | 3/2018 | Godbillon | F21S 43/15 |
| 2019/0074464 | A1 | * | 3/2019 | Koike | H05B 33/06 |
| 2019/0324271 | A1 | * | 10/2019 | Lee | G02B 27/0176 |
| 2019/0386248 | A1 | * | 12/2019 | Itonaga | G09F 9/30 |
| 2020/0035769 | A1 | * | 1/2020 | Youn | H01L 27/326 |
| 2020/0052166 | A1 | * | 2/2020 | Murata | H01L 33/54 |
| 2020/0089004 | A1 | * | 3/2020 | Connor | G02B 27/0176 |
| 2020/0110305 | A1 | * | 4/2020 | Yang | G02F 1/1343 |
| 2021/0057499 | A1 | * | 2/2021 | Shimayama | H05B 33/22 |

(Continued)

FOREIGN PATENT DOCUMENTS

JP   2011053522   3/2011
TW   201523021   6/2015

(Continued)

*Primary Examiner* — Fred Tzeng
(74) *Attorney, Agent, or Firm* — JCIPRNET (57) ABSTRACT A head mounted display including two display units is provided. Each display unit includes a display module and an optical assembly disposed in front of the display module. The display module includes a carrier body and a plurality of light-emitting elements. The carrier body includes a plurality of recesses. Each recess has a bottom surface and a reflective side wall connected to the bottom surface. A plurality of the light-emitting elements are located in the plurality of recesses. Each light-emitting element is disposed on the bottom surface of a corresponding recess. The optical assembly is disposed in front of the display module.

8 Claims, 6 Drawing Sheets

(56) References Cited

U.S. PATENT DOCUMENTS

| | | | |
|---|---|---|---|
| 2021/0057678 A1* | 2/2021 | Motoyama | H01L 27/322 |
| 2021/0063818 A1* | 3/2021 | Yamashita | G02B 6/0023 |
| 2021/0173209 A1* | 6/2021 | Itonaga | G02B 27/02 |

FOREIGN PATENT DOCUMENTS

| | | |
|---|---|---|
| TW | I641869 | 11/2018 |
| TW | I648878 | 1/2019 |
| TW | 201908810 | 3/2019 |

* cited by examiner

HEAD MOUNTED DISPLAY

CROSS-REFERENCE TO RELATED APPLICATION

This application claims the priority benefit of Taiwan application serial no. 109114020, filed on Apr. 27, 2020. The entirety of the above-mentioned patent application is hereby incorporated by reference herein and made a part of this specification.

BACKGROUND

Technical Field

The disclosure relates to a display, and particularly relates to a head mounted display.

Description of Related Art

With the progress in display technology, users are no longer satisfied with watching only two-dimensional images. In order to provide users with more realistic and three-dimensional visual entertainment, virtual reality (VR) has become a new trend in the current display technology. Virtual reality creates a virtual scene that simulates a three-dimensional space to provide users with sensory experiences such as the vision experience, so that the users may watch images of the three-dimensional space in real-time, and even further interact with the virtual images. At present, a common virtual reality display includes a head mounted display. Although the existing head mounted display has good display quality, problems in brightness or signal-to-noise ratio still need to be improved.

SUMMARY

The invention is directed to a head mounted display, which has good brightness or signal-to-noise ratio.

An embodiment of the invention provides a head mounted display including two display units. Each of the display units includes a display module and an optical assembly. The display module includes a carrier body and a plurality of light-emitting elements. The carrier body includes a plurality of recesses. Each of the recesses has a bottom surface and a reflective side wall connected to the bottom surface. The light-emitting elements are located in the recesses. Each of the light-emitting elements is disposed on the bottom surface of one corresponding recess. The optical assembly is disposed in front of the display module.

In an embodiment of the invention, the light-emitting elements include a plurality of micro light-emitting diodes, a plurality of micro organic light-emitting diodes, or a combination thereof.

In an embodiment of the invention, the reflective side wall includes an inclined surface or a curved surface.

In an embodiment of the invention, the display module further includes a plurality of light transparent bodies and a plurality of condenser lens elements. The light transparent bodies are disposed in the recesses and cover the light-emitting elements. The condenser lens elements are respectively arranged on the light transparent bodies.

In an embodiment of the invention, each of the light transparent bodies is a cured colloid, and the cured colloid contacts the bottom surface and the reflective side wall.

In an embodiment of the invention, each of the light transparent bodies is a light transparent element, and the light transparent element is embedded in one corresponding recess.

In an embodiment of the invention, the condenser lens elements are a plurality of Fresnel lens elements.

In an embodiment of the invention, a thickness of each of the light transparent bodies is smaller than a depth of each of the recesses, and the condenser lens elements disposed on the light transparent bodies are located in the recesses.

In an embodiment of the invention, a thickness of each of the light transparent bodies is equal to a depth of each of the recesses, and the condenser lens elements disposed on the light transparent bodies are located outside the recesses.

In an embodiment of the invention, the head mounted display further includes a housing. The housing includes two accommodating slots. The two display units are disposed in the two accommodating slots. A side wall surface of each accommodating slot is a rough surface.

Based on the above description, in the embodiment of the invention, the reflective side wall of the recess is used to converge a divergence angle of a light beam emitted by the light-emitting element disposed in the recess, which helps improving brightness or reduce stray light. Therefore, the head mounted display of the embodiment of the invention has a good brightness or signal-to-noise ratio.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Directional terminology mentioned in the invention, such as "top," "bottom," "left," "right," "front," "back," etc., is used with reference to the orientation of the Figure (s) being described and are not intended to be limiting of the invention.

In the Figures, each of the drawings depicts typical features of methods, structures, and/or materials used in the particular exemplary embodiments. However, these drawings are not to be interpreted as limiting or limiting the scope or property covered by these exemplary embodiments. For example, for clarity's sake, relative size, thickness and position of each film layer, region and/or structure may be reduced or enlarged.

In the following embodiments, the same or similar components are denoted by the same or similar referential numbers, and descriptions of the same technical contents are omitted. Moreover, the features in the different exemplary embodiments may be combined with each other in case of no confliction, and the simple equivalent changes and modifications made in accordance with the scope of the specification or the claims are still within the scope of the patent.

Furthermore, "first", "second", etc. mentioned in the specification and the claims are merely used to name discrete components and should not be regarded as limiting an upper or lower bound of the number of the components, nor is it used to define a manufacturing order or setting order of the components. Moreover, one element/film layer disposed on (or above) another element/film layer may cover a situation that the element/film layer is directly disposed on (or above) the other element/film layer, and the two elements/film layers directly contact with each other; and a situation that the element/film layer is indirectly disposed on (or above) the other element/film layer, and there are one or more elements/film layers between the two elements/film layers.

Figure 1:
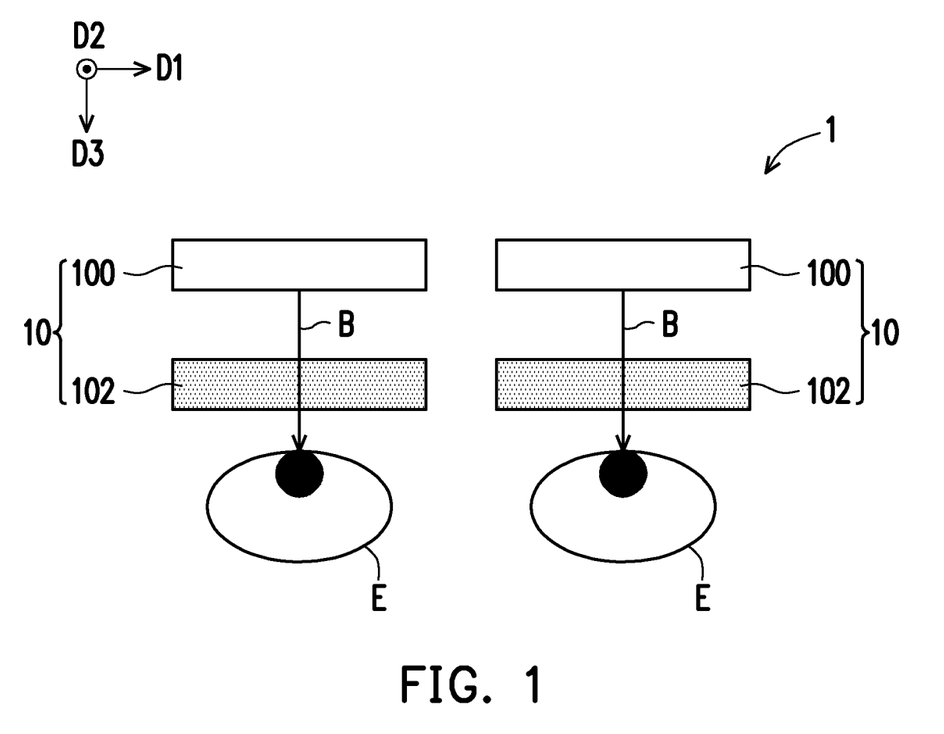
FIG. 1 is a schematic diagram of a head mounted display according to an embodiment of the invention.

FIG. 1 is a schematic diagram of a head mounted display 1 according to an embodiment of the invention. In FIG. 1, in addition to the head mounted display 1, user's eyes (two eyes E) are also drawn to facilitate understanding a relative relationship between the head mounted display 1 and the user's eyes.

Referring to FIG. 1, the head mounted display 1 may include two display units 10. The two display units 10 are respectively disposed in front of the two eyes E of the user, so as to provide the user with sensory experiences such as vision, etc. For example, the two display units 10 may be worn on the head of the user through a fixing element such as a helmet or an eye mask, etc., and placed in front of the two eyes E of the user, but the invention is not limited thereto. In addition, an application scope of the head mounted display 1 may include virtual reality, but the invention is not limited thereto.

Figure 2:
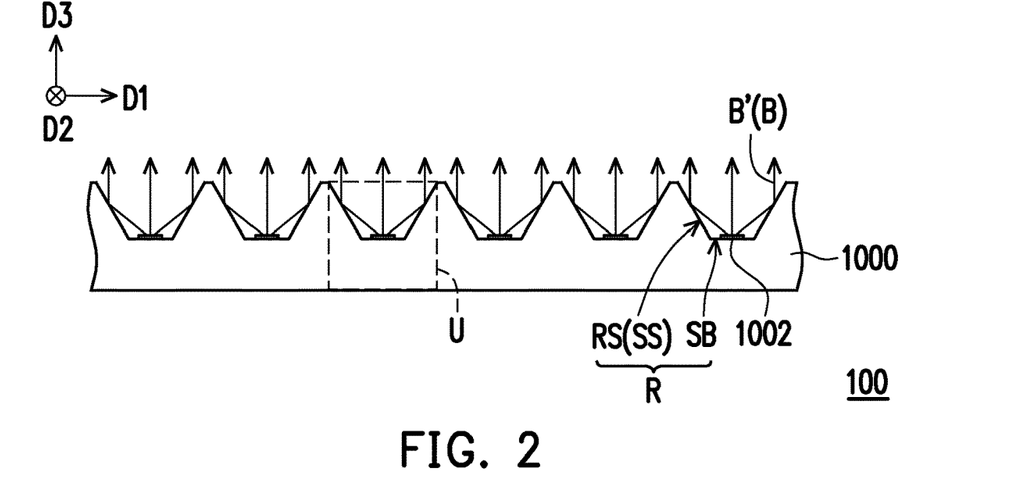
FIG. 2 is a partial schematic cross-sectional view of a display module according to a first embodiment of the invention.
Figure 3:
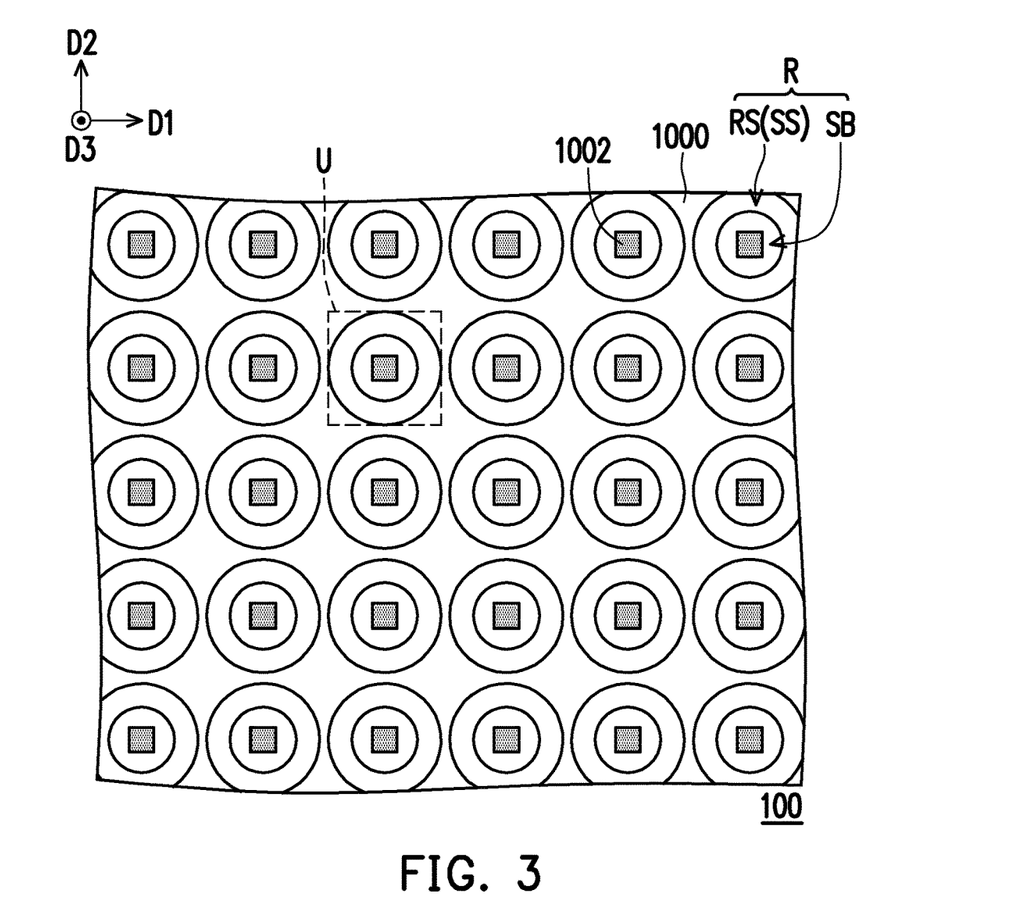
FIG. 3 is a partial schematic top view of the display module according to the first embodiment of the invention.

Each of the display units 10 may include a display module 100 and an optical assembly 102. The display module 100 is adapted to provide a light beam B with image information (such as a gray scale, a color, etc.). FIG. 2 is a partial schematic cross-sectional view of the display module 100 according to a first embodiment of the invention. FIG. 3 is a partial schematic top view of the display module 100 according to the first embodiment of the invention. Referring to FIG. 2 and FIG. 3, the display module 100 may include a carrier body 1000 and a plurality of light-emitting elements 1002.

The carrier body 1000 is adapted to carry the light-emitting elements 1002. In some embodiments, the carrier body 1000 may include a circuit structure (not shown) adapted to electrically connect the light-emitting elements 1002 with an external circuit (not shown), but the invention is not limited thereto.

The carrier body 1000 includes a plurality of recesses R. Each of the recesses R has a bottom surface SB and a side wall surface SS connected to the bottom surface SB. In case that the side wall surface SS of the recess R has a reflective characteristic, for example, when a material of the carrier body 1000 includes metal (such as copper or aluminium, etc., but the invention is not limited thereto), an alloy, or a combination thereof, the side wall surface SS of the carrier body 1000 may be used as a reflective side wall RS. In this case, it is unnecessary to additionally form a reflective layer (such as a metal layer, but the invention is not limited thereto) on the side wall surface SS of the recess R. On the other hand, when a reflectivity of the side wall surface SS of the recess R is low, for example, when the material of the carrier body 1000 includes a light transparent material (such as glass or plastic), a reflective layer (not shown) may be additionally formed on the side wall surface SS of the recess R. In this case, the reflective layer serves as the reflective side wall RS. In some embodiments, as shown in FIG. 2, the reflective side wall RS (the side wall surface SS) may include an inclined surface, but the invention is not limited thereto. In other embodiments, the reflective side wall RS (the side wall surface SS) may include a curved surface.

The light-emitting elements 1002 are adapted to provide the light beam B. For example, the light-emitting elements 1002 may include a plurality of micro light-emitting diodes (LEDs), a plurality of micro organic LEDs, or a combination thereof, but the invention is not limited thereto. The light beam B includes visible light. In some embodiments, the light-emitting elements 1002 may include a plurality of red light-emitting elements (not shown) adapted to provide red light, a plurality of green light-emitting elements (not shown) adapted to provide green light, and a plurality of blue light-emitting elements (not shown) adapted to provide blue light, but the color types of the light-emitting elements 1002 may be changed according to actual requirements, and are not limited to the above colors.

The light-emitting elements 1002 are located in the recesses R. Each of the light-emitting elements 1002 is disposed on the bottom surface SB of a corresponding recess R. In some embodiments, as shown in FIG. 2 and FIG. 3, each of the recesses R may be provided with one light-emitting element 1002, however, a number of the light-emitting elements 1002 configured in each recess R may be changed according to an actual requirement, which is not limited by the invention.

Referring to FIG. 1, the optical assembly 102 is disposed in front of the display module 100, and is located on a transmission path of the light beam B to transmit the light beam output by the display module 100 to the corresponding eyes E.

For example, the optical assembly 102 may include one or a plurality of lens elements (not shown), but the invention is not limited thereto. The one or a plurality of the lens elements may include a convex lens, a concave lens, or a combination thereof. When the optical assembly 102 includes a plurality of the lens elements, the lens elements may have the same or different optical parameter designs. Moreover, the two display units 10 disposed in front of the two eyes E of the user may have equal or unequal numbers of the lens elements, and the equal or unequal numbers of the lens elements may have the same or different optical parameter designs. In some embodiments, the one or a plurality of the lens elements may be one or a plurality of Fresnel lens elements to make the head mounted display 1 light and thin.

As shown in FIG. 2, to use the reflective side wall RS of the recess R to reflect a large-angle light beam (such as a light beam B') in the light beam B, a divergence angle of the light beam B output from the light-emitting element 1002 may be effectively converged, so that the light beam B output from the display module 100 is mostly concentrated at a small angle, which helps improving a screen brightness. Moreover, since a proportion of light in the light beam B causing the stray light is reduced, the signal-to-noise ratio is enhanced. Therefore, the head mounted display 1 may have a good brightness or signal-to-noise ratio.

It should be noted that although FIG. 1 schematically illustrates two display units 10 disposed in parallel in front of the two eyes E of the user (i.e., an included angle between the two display units 10 is 180 degrees), the relative configuration relationship of the two display units 10 (such as the included angle between the two display units 10) is not limited thereto. In some embodiments, the included angle between the two display units 10 may be less than 180 degrees, i.e., the two display units 10 may be obliquely arranged in front of the two eyes E of the user to enhance a field of view (FOV) of the head mounted display 1 in a first direction D1, i.e., an imaging range of an augmented virtual image in the first direction D1. The following embodiments may all be modified in the same way, and details thereof are not repeated.

Moreover, as shown in FIG. 2 and FIG. 3, the display module 100 may be regarded as being composed of a plurality of structure units U. These structure units U are arranged along the first direction D1 and a second direction D2 perpendicular to a normal direction D3 of the carrier body 1000, where a space between two adjacent structure units U arranged in the first direction D1 may be the same as or different from a space between two adjacent structure units U arranged in the second direction D2. Moreover, in FIG. 3, although a shape of the light-emitting element 1000 is schematically illustrated as a quadrangle and a shape of the recess R is schematically illustrated as a circle, the shape of the light-emitting element 1000 or the shape of the recess R may be changed according to actual requirements, and are not limited as that shown in FIG. 3. The following embodiments may all be modified in the same way, and details thereof are not repeated.

Figure 4:
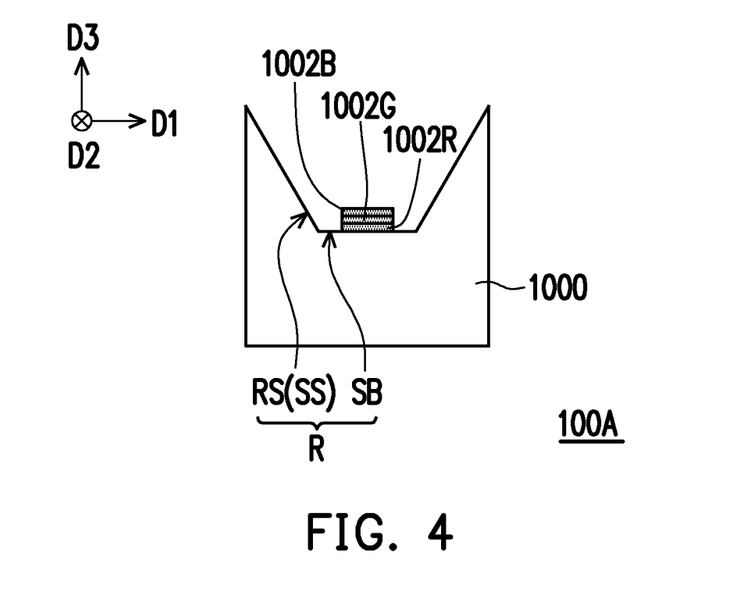
FIG. 4 is a partial schematic cross-sectional view of a display module according to a second embodiment of the invention.
Figure 9:
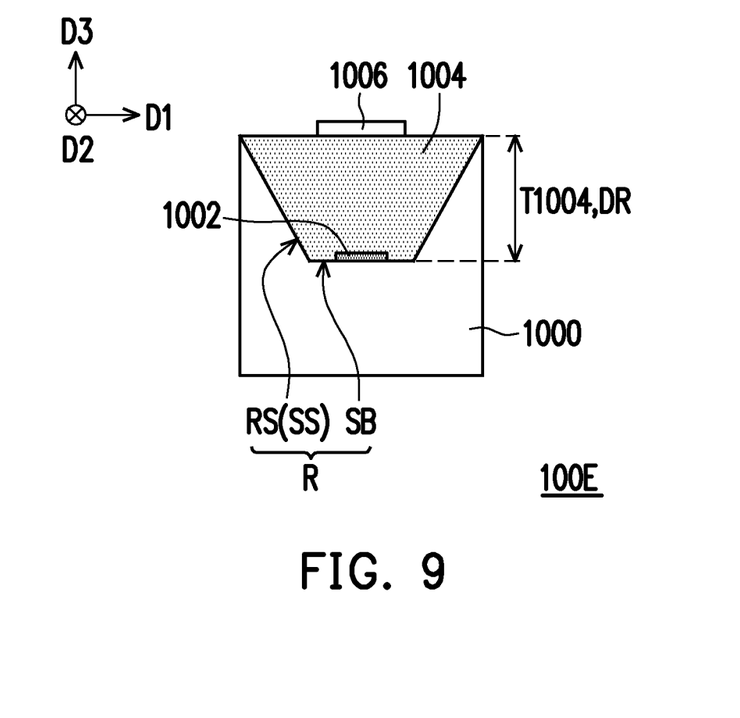
FIG. 9 is a partial schematic cross-sectional view of a display module according to a sixth embodiment of the invention.

Other embodiments of the display module are described below with reference of FIG. 4 to FIG. 9. In FIG. 4 and FIG. 9, only one structure unit of the display module is schematically illustrated.

FIG. 4 is a partial schematic cross-sectional view of a display module 100A according to a second embodiment of the invention. Referring to FIG. 4, a main difference between the display module 100A and the display module 100 of FIG. 2 is as follows. In the display module 100A, each of the recesses R is configured with one or more light-emitting elements, for example, one red light-emitting element 1002R, one green light-emitting element 1002G and one blue light-emitting element 1002B. Moreover, the red light-emitting element 1002R, the green light-emitting element 1002G and the blue light-emitting element 1002B are, for example, sequentially stacked on the bottom surface SB of a same recess R. By stacking the light-emitting elements of different colors on the bottom surface SB of the same recess R, an area used for setting the light-emitting elements may be effectively reduced, which helps realizing volume miniaturization or resolution enhancement. However, in other embodiments, a number, a color type, a relative configuration relationship or a stacking order of the light-emitting elements disposed in each recess R may be changed according to an actual requirement, which are not limited by the invention.

Figure 5:
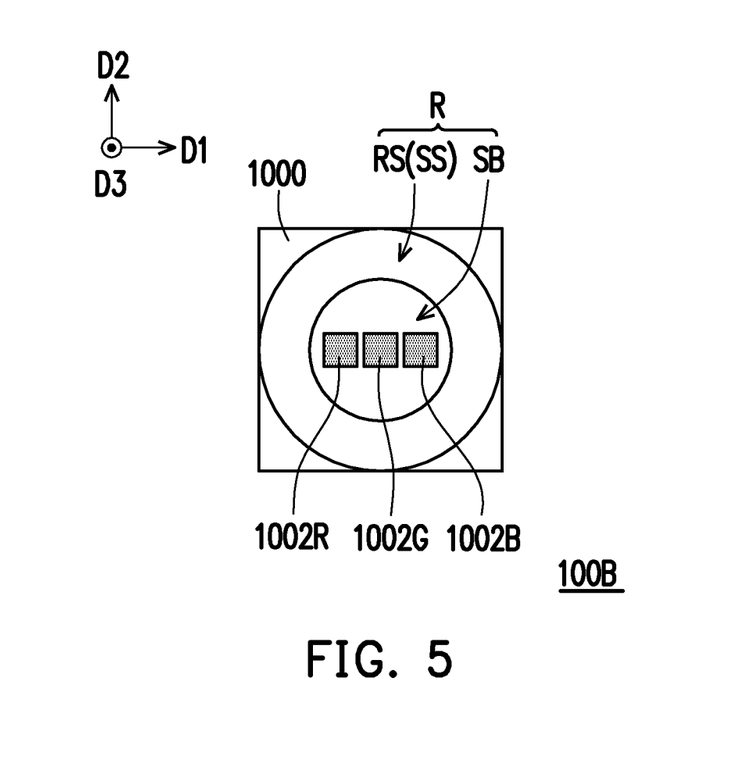
FIG. 5 is a partial schematic top view of a display module according to a third embodiment of the invention.

FIG. 5 is a partial schematic top view of a display module 100B according to a third embodiment of the invention. Referring to FIG. 5, a main difference between the display module 100B and the display module 100A of FIG. 4 is as follows. In the display module 100B, the red light-emitting element 1002R, the green light-emitting element 1002G and the blue light-emitting element 1002B are all disposed the bottom surface SB of the same recess R and are in contact with the bottom surface SB. Although FIG. 5 schematically illustrates that the red light-emitting element 1002R, the green light-emitting element 1002G, and the blue light-emitting element 1002B are arranged along the first direction D1, in other embodiments, a number, a color type, a relative configuration relationship of the light-emitting elements disposed in each recess R may be changed according to an actual requirement, which are not limited by the invention.

Figure 6:
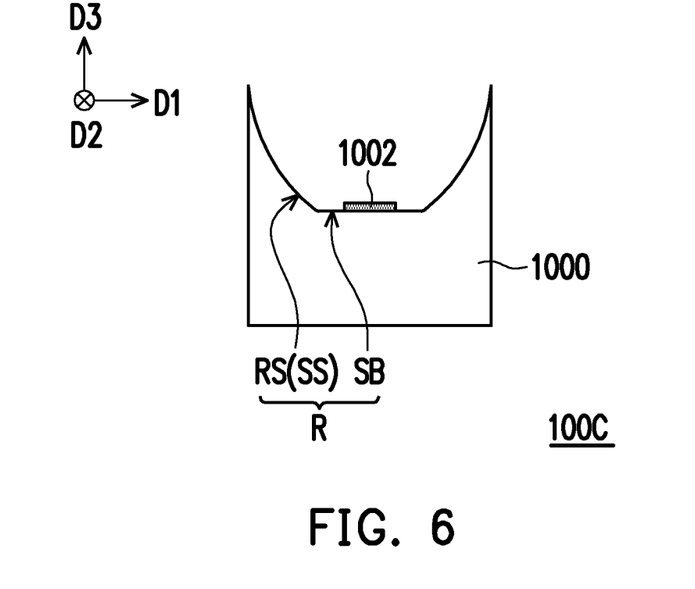
FIG. 6 is a partial schematic cross-sectional view of a display module according to a fourth embodiment of the invention.

FIG. 6 is a partial schematic cross-sectional view of a display module 100C according to a fourth embodiment of the invention. Referring to FIG. 6, a main difference between the display module 100C and the display module 100 of FIG. 2 is as follows. In the display module 100C, the reflective side wall RS (the side wall surface SS) may include a curved surface. A radius of curvature of the curved surface may be changed as required, and is not limited to that shown in FIG. 6.

Figure 7:
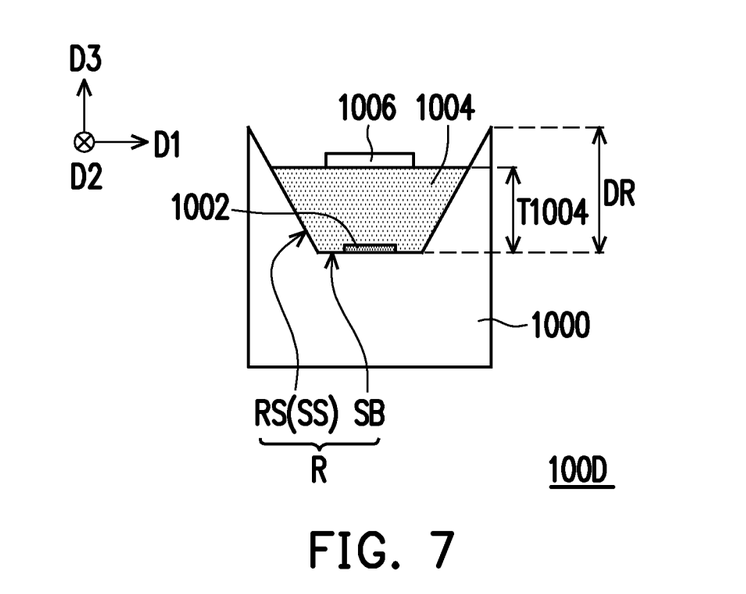
FIG. 7 is a partial schematic cross-sectional view of a display module according to a fifth embodiment of the invention.
Figure 8:
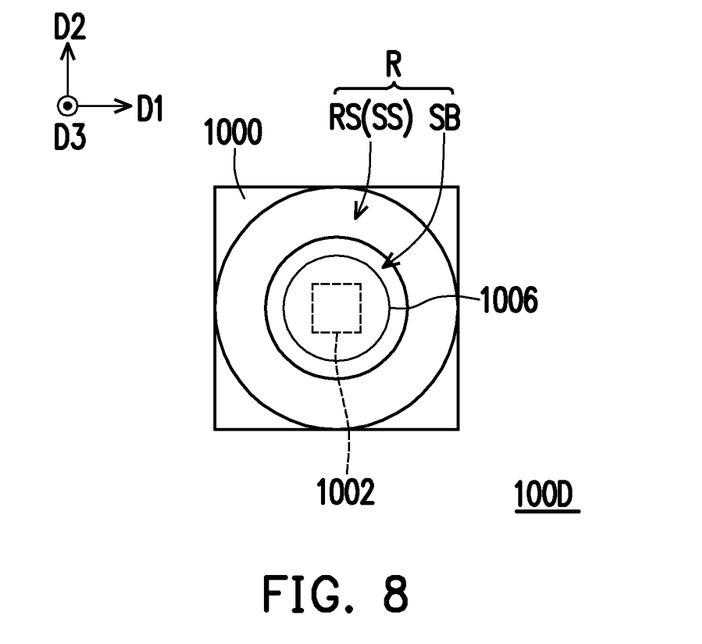
FIG. 8 is a partial schematic top view of the display module according to the fifth embodiment of the invention.

FIG. 7 is a partial schematic cross-sectional view of a display module 100D according to a fifth embodiment of the invention. FIG. 8 is a partial schematic top view of the display module 100D according to the fifth embodiment of the invention. Referring to FIG. 7 and FIG. 8, a main difference between the display module 100D and the display module 100 of FIG. 2 and FIG. 3 is as follows. The display module 100D further includes a plurality of light transparent bodies 1004 and a plurality of condenser lens elements 1006. The light transparent bodies 1004 are disposed in the recesses R and cover the light-emitting elements 1002. The condenser lens elements 1006 are respectively arranged on the light transparent bodies 1004. In some embodiments, as shown in FIG. 7, the number of the light transparent body 1004 and the number of the condenser lens element 1006 in each structure unit may be respectively one, and the one light transparent body 1004 is disposed in one corresponding recess R and covers one or a plurality of the light-emitting elements 1002 disposed on the bottom surface SB of the recess R, and the one condenser lens element 1006 is disposed on the one light transparent body 1004 and is located above the one or a plurality of the light-emitting elements 1002. In order to clearly show a relative relationship between the condenser lens element 1006, the light-emitting element 1002, the bottom surface SB, and the reflective side wall RS (the side wall surface SS), the light transparent body 1004 is omitted in FIG. 8.

The light transparent body 1004 is adapted to protect the light-emitting element 1002 or carry the condenser lens element 1006. In some embodiments, the light transparent body 1004 is, for example, a cured colloid, and the cured colloid contacts the bottom surface SB and the reflective side wall RS. In some other embodiments, the light transparent body 1004 is, for example, a light transparent element (such as a molded light transparent element, but the invention is not limited thereof), and the light transparent element may be embedded in one corresponding recess R. In some other embodiments, the light transparent element may be fixed in the recess R through a light transparent adhesive layer (not shown) or other mechanism elements (not shown), but the invention is not limited thereto.

The condenser lens element 1006 may be used to further converge the divergence angle of the light beam, so that the screen brightness is further increased or the stray light is further reduced. In some embodiments, the condenser lens element 1006 may include one or a plurality of lens elements (not shown). The one or a plurality of the lens elements may include a convex lens, a concave lens, or a combination thereof. In some embodiments, the one or a plurality of the lens elements may be one or a plurality of Fresnel lens elements to make the display module 100D light and thin.

In some embodiments, as shown in FIG. 7, a thickness T1004 of the light transparent body 1004 may be smaller than a depth DR of the recess R, and the condenser lens element 1006 disposed on the light transparent body 1004 may be located in the recess R. However, the relative relationship between the thickness T1004 and the depth DR or the relative relationship between the condenser lens element 1006 and the recess R may be changed according to an actual requirement, and are not limited as that shown in FIG. 7.

FIG. 9 is a partial schematic cross-sectional view of a display module 100E according to a sixth embodiment of the invention. Referring to FIG. 9, a main difference between the display module 100E and the display module 100D of FIG. 7 is as follows. In the display module 100E, the thickness T1004 of the light transparent body 1004 is equal to the depth DR of the recess R, and the condenser lens element 1006 disposed on the light transparent body 1004 is located outside the recess R, i.e., the condenser lens element 1006 is not located in the recess R.

Figure 10:
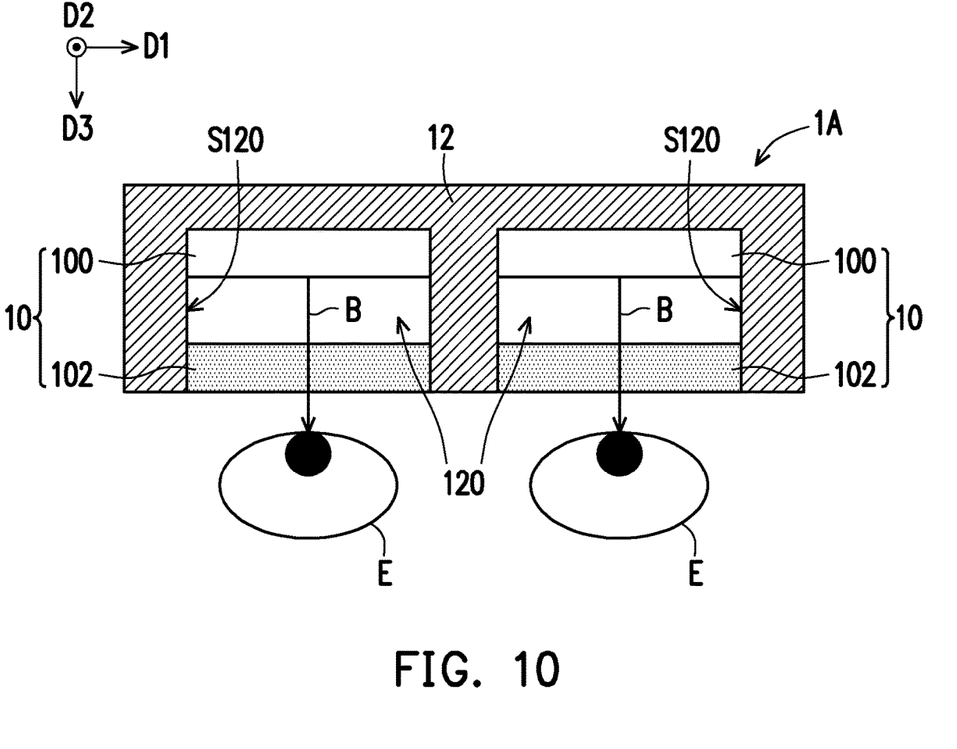
FIG. 10 is a schematic diagram of a head mounted display according to another embodiment of the invention.

FIG. 10 is a schematic diagram of a head mounted display 1A according to another embodiment of the invention. Referring to FIG. 10, a main difference between the head mounted display 1A and the head mounted display 1 of FIG. 1 is as follows. In addition to the two display units 10, the head mounted display 1A further includes a housing 12. The housing 12 includes two accommodating slots 120. The two display units 10 are disposed in the two accommodating slots 120. A side wall surface S120 of each accommodating slot 120 is a rough surface. For example, the side wall surface S120 of the accommodating slot 120 may achieve a light diffusion effect through surface atomization treatment or by setting light scattering particles, etc., so as to reduce a light intensity of the stray light, and enhance the signal-to-noise ratio.

In summary, in the embodiments of the invention, the reflective side wall of the recess is used to converge a divergence angle of the light beam emitted by the light-emitting element disposed in the recess, which helps improving brightness or reduce the stray light. Therefore, the head mounted display of the embodiments of the invention has a good brightness or signal-to-noise ratio. In some embodiments, the reflective side wall may include an inclined surface or a curved surface as required. In some embodiments, each recess may be provided with one or a plurality of the light-emitting elements, and a plurality of the light-emitting elements may be vertically stacked on the bottom surface of the recess or all disposed on the bottom surface of the recess to contact the bottom surface of the recess. In some embodiments, the display module may further include light transparent bodies to protect the light-emitting elements. In some embodiments, the display module may further include condenser lens elements to further increase the screen brightness or further reduce the stray light. In some embodiments, the head mounted display may further include a housing, where a side wall surface of an accommodating slot of the housing may be a rough surface to reduce a light intensity of the stray light, thereby improving the signal-to-noise ratio.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A head mounted display comprising:
two display units, each of the display units comprising:
   a display module comprising:
      a carrier body comprising a plurality of recesses, wherein each of the recesses has a bottom surface and a reflective side wall connected to the bottom surface; and
      a plurality of light-emitting elements located in the recesses, wherein each of the light-emitting elements is disposed on the bottom surface of one corresponding recess;
   an optical assembly disposed in front of the display module;
   a plurality of light transparent bodies disposed in the recesses and covering the light-emitting elements; and
   a plurality of condenser lens elements respectively arranged on the light transparent bodies,
   wherein each of the light transparent bodies is a cured colloid, and the cured colloid contacts the bottom surface and the reflective side wall.

2. The head mounted display as claimed in claim 1, wherein the light-emitting elements comprise a plurality of micro light-emitting diodes, a plurality of micro organic light-emitting diodes, or a combination thereof.

3. The head mounted display as claimed in claim 1, wherein the reflective side wall comprises an inclined surface or a curved surface.

4. The head mounted display as claimed in claim 1, wherein each of the light transparent bodies is a light transparent element, and the light transparent element is embedded in one corresponding recess.

5. The head mounted display as claimed in claim 1, wherein the condenser lens elements are a plurality of Fresnel lens elements.

6. The head mounted display as claimed in claim 1, wherein a thickness of each of the light transparent bodies is smaller than a depth of each of the recesses, and the condenser lens elements disposed on the light transparent bodies are located in the recesses.

7. The head mounted display as claimed in claim 1, wherein a thickness of each of the light transparent bodies is equal to a depth of each of the recesses, and the condenser lens elements disposed on the light transparent bodies are located outside the recesses.

8. The head mounted display as claimed in claim 1, further comprising:
a housing comprising two accommodating slots, wherein the two display units are disposed in the two accommodating slots, and a side wall surface of each accommodating slot is a rough surface.

* * * * *